Patented Feb. 6, 1951

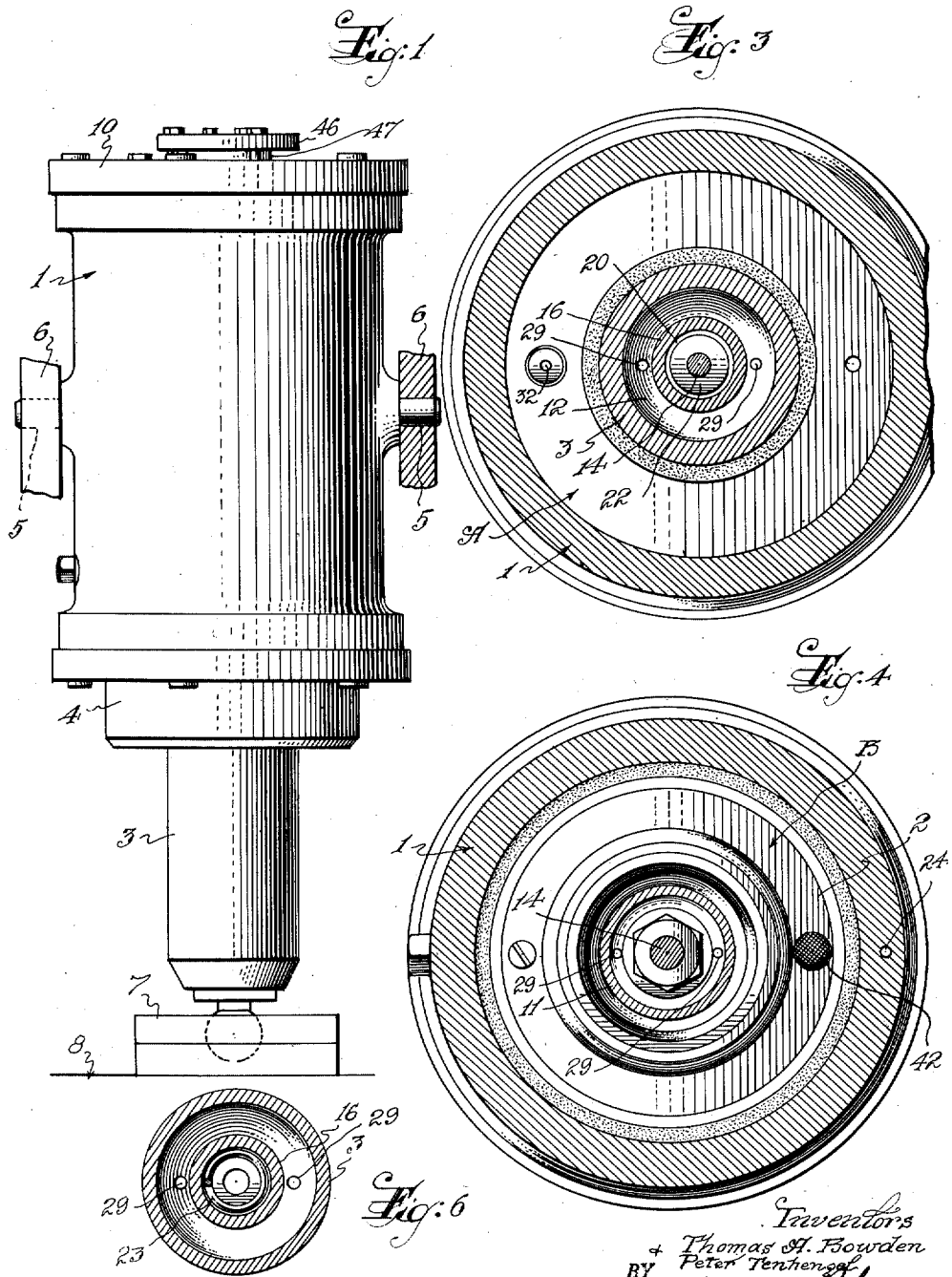

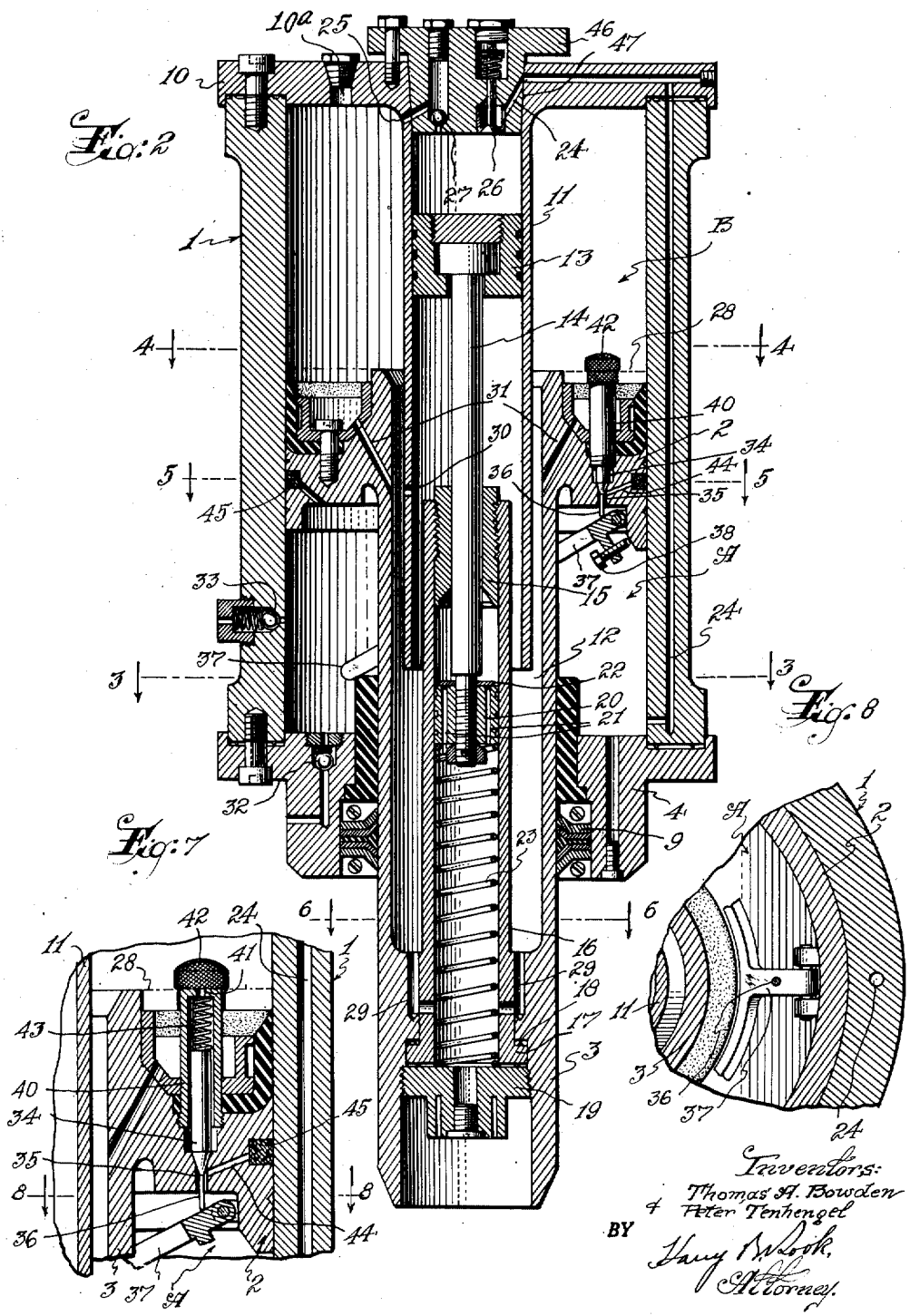

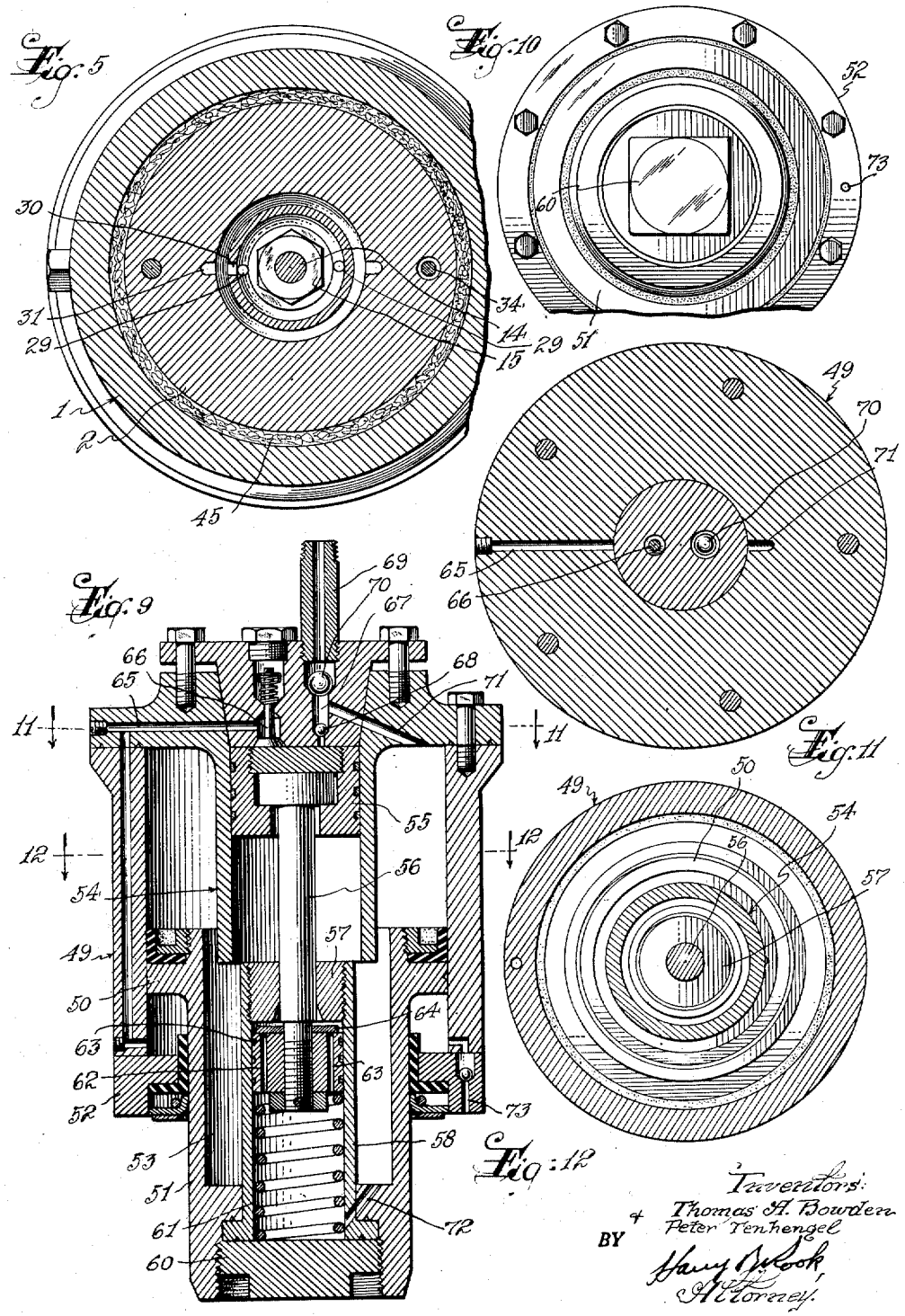

2,540,708

UNITED STATES PATENT OFFICE 2,540,708

FLUID PRESSURE DEVICE

Thomas A. Bowden and Peter Tenhengel, Morristown, N. J.

Application June 9, 1948, Serial No. 32,005

8 Claims. (Cl. 267—64)

This invention relates to a fluid pressure device which may be used as a compression spring wherever two bodies are so associated that relative movement thereof toward and from each other is to be resiliently resisted, the device being adaptable for use as a spring support in automobiles and also as a variable stroke air compressing unit.

A principal object of the invention is to provide a fluid pressure device that shall embody novel and improved features of construction whereby the device can be utilized as a combined spring support and shock absorber for vehicles, particularly automobiles and especially motor trucks.

Another object is to provide an air compressor wherein air may be compressed under conditions where the distance of reciprocating movement between a piston and the cylinder, that is, the stroke, is variable.

A further object is to provide a fluid pressure device of the general character described which shall include a main cylinder having a relatively reciprocable main piston therein, and a secondary cylinder within the main cylinder having a relatively reciprocable piston therein connected to and carried by the main piston, and novel and improved hydraulic means for causing relative movement of the main piston and secondary piston to compensate for variable relative movements of the main piston and cylinder and retard such relative movements in one direction.

Other objects, advantages and results of the invention will be brought out by the following description in conjunction with the accompanying drawings, in which Figure 1 is a side elevational view of a fluid pressure device embodying the invention;

Figure 2 is an enlarged central vertical sectional view through the device;

Figure 3 is an enlarged horizontal sectional view, approximately on the plane of the line 3—3 of Figure 2;

Figure 4 is a similar view, approximately on the plane of the line 4—4 of Figure 2;

Figure 5 is a horizontal sectional view, approximately on the plane of the line 5—5 of Figure 2;

Figure 6 is a similar view, on the plane of the line 6—6 of Figure 2;

Figure 7 is a further enlarged fragmentary vertical sectional view of the relief valve shown in Figure 2;

Figure 8 is a fragmentary horizontal sectional view, approximately on the plane of the line 8—8 of Figure 7;

Figure 9 is a central vertical sectional view of a variable stroke air compressor embodying the invention;

Figure 10 is a bottom plan view thereof;

Figure 11 is a horizontal sectional view, on the plane of the line 11—11 of Figure 9, and Figure 12 is a horizontal sectional view, on the plane of the line 12—12 of Figure 9.

Specifically describing the embodiment of the invention illustrated in Figures 1-8, inclusive, the invention is shown as including a main cylinder 1 having a main piston 2 reciprocable therein and provided with a piston rod 3 projecting through a head plate 4 at one end of the cylinder. The cylinder and the piston rod 3 are to be connected to two bodies to be resiliently relatively movably associated, for example, the chassis or body and the axle of an automobile. For example, the cylinder may have pivot studs 5 projecting from its side walls to be mounted in suitable bearings or brackets 6 on the vehicle body, while the end of the piston rod may be connected to a ball and socket joint 7 which in turn may be secured to a vehicle axle generally designated by the line 8. The head plate 4 of the main cylinder has a suitable fluid tight bearing 9 for the main piston rod 3, and the head plate 10 opposite the head 4 has a secondary cylinder 11 connected therethrough and projecting coaxially into the main cylinder 1 and loosely into a coaxial chamber 12 at the inner end of the main piston rod 3. A secondary piston 13 is relatively reciprocably mounted in the secondary cylinder 11 and has a piston rod 14 slidable in a bearing 15 at one end of a coaxial tube 16 secured at one end to the main piston rod 3. As shown, the tube has an end flange 17 clamped between a shoulder 18 in the main piston rod and a plug 19 screwed into the piston rod.

At the end of the piston rod 14 opposite the piston 13 is a valve piston 20 that has longitudinal ports 21 with which cooperate a suitable valve which is shown as a flat ring 22. The valve ring 22 normally rests by gravity on the upper end of the valve piston to close the ports, and the ports may establish communication with the valve tube 16 at opposite ends of the valve piston. A spring 23 normally influences the piston 13 toward the upper end of the cylinder 11 which communicates through a valve passage 24 with a chamber A in the main cylinder 1 beneath the main piston 2 and also communicates through a valve passage 25 with a chamber B in the main cylinder at the upper end of the main piston. The passage 24 is controlled by a spring closed check valve 26 which permits flow of air only from the chamber A into the cylinder 11, while the passage 25 is controlled by a ball check valve 27 that permits passage of air only from the cylinder 11 into the chamber B.

Normally there is a quantity of oil in the chamber 12 in the main piston rod, the level of the oil being generally indicated by the broken line 28, the oil being admitted into the valve tube 20 by ducts 29 at the lower end of the chamber 12. Any air trapped in the cylinder 11 below the piston 13 may escape through a port 30 in the wall of the cylinder 11 and ducts 31 through which the oil may also flow from above the piston 2 into the chamber 12.

Assuming the device to be mounted on a vehicle, initially a quantity of air under pressure will be pumped into the chamber B of the main cylinder above the piston 2 through a charging opening 10a so as to initially support the body of the vehicle. Normally, the piston 13 will be in contact with the cylinder head plate 10 and oil will pass freely through the ports 21 in the valve piston 20 so as to surround the piston. In case of sudden descent of the main cylinder 1 as the result of, for example, a depression in the road, the shock will be cushioned by the air in the chamber B and the piston 13 and valve piston 20 will be depressed to permit oil to flow through the ports 21 into the space above the valve piston. On the rebound, upward movement of the piston 13 will be retarded by the oil above the valve piston and a partial vacuum will be created in the cylinder 11 above the piston 13 to cause a snubbing action or a resilient counteraction to the rebound. At the same time, air will be compressed in the chamber A of the main cylinder below the main piston and some of the compressed air will be forced through the passage 24 into the cylinder 11 above the secondary piston 13. The oil trapped above the valve piston 20 will then slowly escape through the clearance between the piston rod 14 and the bearing 15 until the pressures in the cylinder 11 above the piston 13 and in the chamber B and at opposite sides of the valve piston 20 are equalized, after which the spring 23 will force the hold-back or valve piston 20 and the secondary piston 13 upwardly so as to cause displacement of air from the cylinder 11 above the piston into the chamber B. If the main piston should be forced upwardly or the main cylinder should be forced downwardly before the secondary piston 13 has fully returned to its normal position, the secondary piston and the main piston 2 will move together at about the same speed and air will be displaced from the cylinder 11 into the chamber B until the piston 13 contacts the head plate 10; then, and only then, will the valve ring 22 open to allow oil to pass through the valve piston 20 to the upper side thereof in readiness for the snubbing action.

Thus, the device constitutes a pump which is operative incident to and during running of the vehicle to supply compressed air to the chamber B for resiliently supporting the vehicle, and also acts as a snubber for the rebound, and the construction shown and described compensates for variation in the stroke, i. e., the relative movement of said pistons and the two cylinders 1 and 11, which depends upon the extent of movement of the main cylinder 1 as the result of roadway roughness.

In case the pressure in the chamber A below the main piston 2 becomes less than atmospheric pressure, a check valve 32 in the head plate 4 will open to permit air to enter said chamber. Should the pressure become excessive in said chamber A, for example, ten (10) pounds above atmospheric pressure, a spring closed vent valve 33 will automatically open to release the surplus pressure.

In case of unusually severe rebound, the main piston 2 will close the vent port 33 so as to build up pressure in the chamber A and provide a supplemental air cushion.

Where the invention is being used as a spring support for a vehicle and the distance between the points of connection 6 and 7 of the fluid pressure device with the axle and vehicle body, respectively, becomes too great, it is desirable to automatically release some of the air pressure from the chamber A. This can be effected by a pressure release valve mechanism that comprises a spring seated needle valve 34 in the main piston 2 which normally closes a duct 35 through the piston and has its lower end reduced and projecting beyond the bottom of the piston, as indicated at 36, to cooperate with a lever 37 having one end pivoted on the piston and its other end adapted to engage the bottom wall of the chamber A when the piston B moves too close to said wall. This lever is normally adjusted to operate at the desired point by a set screw 38. In operation, when the free end of the lever 37 engages the bottom wall of the chamber A, further relative movement of the piston 2 and the main cylinder tending to bring the piston nearer the head plate 4, will cause actuation of the lever so as to open the valve 34 and permit escape of fluid pressure from the chamber A to the chamber B. This will permit the piston and cylinder to move to their normal relation.

The valve structure may be of any suitable type, but as shown, the valve 34 is slidably mounted in a casing 40 which is screwed into the piston and has a hole 41 in its outer end covered by a screen 42 to prevent the solid matter in the oil above the piston from entering the valve passage, a spring 43 being interposed between the end of the casing 40 and the valve 34.

Preferably a lateral duct 44 is provided in the piston between the valve duct 35 and a felt lubricating ring 45 to conduct oil from the upper side of the piston to the contacting surfaces of the piston and the cylinder.

The valves 26 and 27 may also be mounted in the head plate 10 in any suitable way, but as shown, the two valves are carried by a plug 46 that has tapered outer surfaces 47 tightly engaging correspondingly tapered surfaces in the head plate 10, the plug being separably secured to the head plate by cap screws 48.

As hereinbefore stated, the invention may also be embodied in a variable stroke air compressor, and such an embodiment is shown in Figures 9–12, inclusive, where the reference character 49 designates the main cylinder in which is reciprocable the main piston 50 whose piston rod 51 is slidable through the head plate 52 and has a chamber 53 at its inner end in which is relatively reciprocable the secondary cylinder 54 in which in turn is reciprocable the secondary piston 55 whose rod 56 is slidable through a bearing 57 in the upper end of a valve tube 58 that is coaxial with the chamber 53. This valve tube is closed at its lower end and secured to the piston by a plug 60, and a compression spring 61 is interposed between said plug and the lower end of a valve piston 62 that is similar in construction and operation to the valve piston 20 and is connected to the piston rod 56 and slidable in the valve tube 58. The valve piston has longitudinal ports 63 with which cooperate a valve ring 64 like the ring 22.

The upper end of the secondary cylinder 54 above the piston 55 communicates through a passage 65 with the end of the main cylinder 49 below the piston 50, and said passage is controlled by a spring closed check valve 66 that corresponds to the check valve 26. Also communicating with the end of the secondary cylinder 54 above the secondary piston 55 is an outlet port 67 that is controlled by a ball check 68 so that air may pass outwardly from the cylinder through said port but may not pass inwardly. The outer end of the port 67 is connected by a suitable coupling 69 to a receiving tank for compressed air or leads to some other point at which compressed air is to be used, and a ball check 70 prevents flow of air from the receiving tank into the port 67. Also, the main cylinder 49 above the piston 50 is connected by a duct 71 to the port 67 above the valve 68.

A valve controlled port 73 like the valve port 32 is provided to permit atmospheric air to enter the main cylinder below the piston.

The chamber 53 will contain a quantity of oil the level of which preferably will be slightly above the upper end of the main piston 50, and a duct 72 will permit the flow of some of said oil from the chamber 53 into the valve tube 58.

The operation of the device is substantially the same as that hereinbefore described except that compressed air above the main piston and the secondary piston is forced into a receiver or to some other point of use.

The main advantage of this structure is that it permits air to be compressed where the stroke of the relatively reciprocable piston and cylinder is variable. For example, such a device might be mounted between the body and axle of an automobile so that relative movement of the body and axle could be used to compress air for any desired purpose, for example, into a receiver for inflating tires. Other uses of the compressor will occur to those skilled in the art.

Having thus described the invention, what we claim is:

1. A fluid pressure device comprising a main piston, a main cylinder in which said main piston is relatively slidable and having an upper air chamber at one end and a lower air chamber at its other end, a secondary piston carried by and movable with and relatively to said main piston, a secondary cylinder carried by said main cylinder and in which said secondary piston is relatively slidable, there being a secondary air chamber in said secondary cylinder at one end of said secondary piston, at least one small passage between said secondary chamber and said lower chamber, and a check valve therefor to permit flow of air from said lower chamber to said secondary chamber upon relative movement of said main cylinder and said main piston in one direction, at least one small passage between said upper chamber and said secondary chamber, and a check valve therefor to permit flow of air from said secondary chamber into said upper chamber upon relative movement of said main cylinder and said main piston in the opposite direction, means normally yieldingly influencing said secondary piston in the direction to force air from said secondary chamber, and means for yieldingly retarding movement of said secondary piston in said direction and for permitting free movement thereof in the opposite direction.

2. A fluid pressure device as defined in claim 1, wherein the last-named means includes a liquid chamber in one end of said main piston opening into said upper air chamber and containing liquid, a valve cylinder in said liquid chamber having inlets for liquid at its lower end, a valve piston reciprocable in said valve cylinder and having ports therethrough, a valve at the upper end of said piston to close said ports upon movement of said secondary piston in the second-mentioned direction under the influence of relative movement of said main cylinder and main piston, a valve piston rod connecting said valve piston to said secondary piston, a guide in the upper end of said valve cylinder below the level of said liquid through which said valve piston rod is loosely slidable to permit slow flow of liquid from said valve cylinder above said valve piston.

3. A fluid pressure device comprising a main piston, a main cylinder in which said main piston is relatively slidable and having an upper air chamber at one end and a lower air chamber at its other end, a secondary piston carried by and movable with and relatively to said main piston, a secondary cylinder carried by said main cylinder and in which said secondary piston is relatively slidable, there being a secondary air chamber in said secondary cylinder at one end of said secondary piston, means establishing communication between said secondary air chamber and said upper and lower chambers in the main cylinder upon relative movement of said main cylinder and said main piston in opposite directions, respectively, means for normally influencing said secondary piston in one direction relatively to said main piston, and means for yieldingly retarding such movement of said secondary piston and for permitting free movement of said secondary piston in the other direction, the last-named means comprising a hydraulic valve cylinder having liquid therein in said main piston and a valve piston connected to said secondary piston and reciprocable in said valve cylinder and having valved ports therethrough that are automatically closed upon movement of said secondary piston in the first-mentioned direction under the influence of relative movement of said main piston and said main cylinder.

4. A fluid pressure device comprising a main piston, a main cylinder in which said main piston is relatively slidable and having an upper air chamber at one end and a lower air chamber at its other end, a secondary piston carried by and movable with and relatively to said main piston, a secondary cylinder carried by said main cylinder and in which said secondary piston is relatively slidable, there being a secondary air chamber in said secondary cylinder at one end of said secondary piston, means establishing communication between said secondary air chamber and said upper and lower chambers in the main cylinder upon relative movement of said main cylinder and said main piston in opposite directions, respectively, means for normally influencing said secondary piston in one direction yieldingly retarding such movement of said secondary piston and for permitting free movement of said secondary piston in the other direction, the last-named means comprising a hydraulic valve cylinder having liquid therein in said main piston and a valve piston reciprocable in said valve cylinder, a piston rod connecting said secondary piston to said valve piston, a guide at one end of said valve cylinder below the level of said liquid through which said valve piston rod is loosely slidable.

5. A fluid pressure device as defined in claim 3 with the addition of a passage through said main piston into said valve cylinder through which said liquid is subjected to air pressure in said first air chamber.

6. A fluid pressure device as defined in claim 4 with the addition of a passage through said main piston into said valve cylinder through which said liquid is subjected to air pressure in said first air chamber.

7. A fluid pressure device comprising a main piston, a main cylinder in which said main piston is relatively slidable and having an upper air chamber at one end and a lower air chamber at its other end, a secondary piston carried by and movable with and relatively to said main piston, a secondary cylinder carried by said main cylinder and in which said secondary piston is relatively slidable, there being a secondary air chamber in said secondary cylinder at one end of said secondary piston, means establishing communication between said secondary air chamber and said upper and lower chambers in the main cylinder upon relative movement of said main cylinder and said main piston in opposite directions, respectively, means for normally influencing said secondary piston in one direction relatively to said main piston, and means for yieldingly retarding such movement of said secondary piston and for permitting free movement of said secondary piston in the other direction, the last-named means comprising a liquid chamber in one end of said main piston opening into said upper air chamber and containing liquid, a valve cylinder in said liquid chamber having inlets for liquid at its lower end, a valve piston reciprocable in said valve cylinder and having ports therethrough, a valve at the upper end of said piston to close said ports upon movement of said secondary piston in the first-mentioned direction under the influence of relative movement of said main cylinder and main piston, a piston rod connecting said valve piston to said secondary piston, a guide in the upper end of said valve cylinder below the level of said liquid through which said valve piston rod is loosely slidable to permit slow flow of liquid from said valve cylinder above said valve piston.

8. A fluid pressure device comprising a main piston, a main cylinder in which said main piston is relatively slidable and having an upper air chamber at one end and a lower chamber at its other end, a secondary piston carried by and movable with and relatively to said main piston, a secondary cylinder carried by said main cylinder and in which said secondary piston is relatively slidable, there being a secondary air chamber in said secondary cylinder at one end of said secondary piston, means normally yieldingly influencing said secondary piston in the direction to force air from said secondary chamber, means for yieldingly retarding movement of said secondary piston in said direction and for permitting free movement thereof in the opposite direction, an outlet for said secondary chamber and a check valve therefor, and an outlet for said upper chamber communicating with a common discharge passage for said outlet of said upper chamber and secondary chamber outwardly of said check valve, and a second check valve in said discharge passage.

THOMAS A. BOWDEN.
PETER TENHENGEL.

REFERENCES CITED

The following references are of record in the file of this patent:

UNITED STATES PATENTS

| Number | Name | Date |
| --- | --- | --- |
| 2,443,616 | Gruss | June 22, 1948 |
| 2,443,730 | Gruss | June 22, 1948 |